(12) United States Patent
Sørensen et al.

(10) Patent No.: US 9,172,817 B2
(45) Date of Patent: *Oct. 27, 2015

(54) COMMUNICATION SYSTEM

(75) Inventors: Karsten Vandborg Sørensen, Dublin (IE); Jon Bergenheim, Dublin (IE); Koen Vos, Dublin (IE)

(73) Assignee: Skype, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/336,547

(22) Filed: Dec. 23, 2011

(65) Prior Publication Data

US 2012/0163612 A1 Jun. 28, 2012

Related U.S. Application Data

(63) Continuation of application No. 12/070,720, filed on Feb. 20, 2008, now Pat. No. 8,098,813.

(30) Foreign Application Priority Data

Jan. 21, 2008 (GB) .................................. 0801108.2

(51) Int. Cl.
*H04M 9/08* (2006.01)

(52) U.S. Cl.
CPC ..................................... *H04M 9/085* (2013.01)

(58) Field of Classification Search
CPC ............ H04B 3/23; H04B 3/20; H04B 3/238; H04B 3/38; H04M 9/082; A61F 2/20; G10K 11/1788; G10K 2210/1282; G10K 2210/112; G10K 2210/1081; H04Q 11/04; H04J 1/00; H04L 5/16

USPC ........... 379/406.01–406.16, 3; 381/70–71.14; 370/286–296; 455/570

See application file for complete search history.

(56) References Cited

U.S. PATENT DOCUMENTS 4,615,025 A * 9/1986 Vry ............................... 370/287
6,650,701 B1 11/2003 Hsiang et al.
(Continued)

FOREIGN PATENT DOCUMENTS

EP    1 453 244 A2    9/2004
JP    02-209027       8/1990
(Continued)

OTHER PUBLICATIONS

"Non-Final Office Action", U.S. Appl. No. 12/070,719, (Mar. 22, 2011), 6 pages.
(Continued)

*Primary Examiner* — Akelaw Teshale
(74) *Attorney, Agent, or Firm* — Danielle Johnston-Holmes; Micky Minhas

(57) ABSTRACT

An echo component of a first signal received at an audio input device is removed. A second signal is output from an audio output device. The echo component in the first signal is the result of the second signal traversing an echo path. The characteristics of the first and second signals are compared, and if the first signal only comprises the echo, an estimate of the echo path is determined by comparing the first and second signals. The echo path estimate is applied to the first signal to determine an equalized first signal, which is is compared with the second signal to determine an estimate of the echo component. The echo component from the first signal is removed in dependence on the estimate of the echo component.

20 Claims, 3 Drawing Sheets

(56) References Cited

U.S. PATENT DOCUMENTS

| | | | |
|---|---|---|---|
| 6,850,783 B1 | 2/2005 | Romesburg | |
| 7,426,270 B2 | 9/2008 | Alves et al. | |
| 8,085,930 B2 | 12/2011 | Sorensen et al. | |
| 8,098,813 B2 | 1/2012 | Sorensen et al. | |
| 2002/0191779 A1* | 12/2002 | Pham | 379/406.08 |
| 2004/0120272 A1* | 6/2004 | Yong-Woon | 370/292 |
| 2007/0041575 A1 | 2/2007 | Alves et al. | |
| 2008/0310617 A1* | 12/2008 | Daecke et al. | 379/406.08 |
| 2009/0089054 A1* | 4/2009 | Wang et al. | 704/233 |
| 2009/0185515 A1 | 7/2009 | Sorensen et al. | |
| 2009/0185674 A1 | 7/2009 | Sorensen et al. | |

FOREIGN PATENT DOCUMENTS

| | | |
|---|---|---|
| JP | 10041858 A | 7/1996 |
| WO | WO 00/08837 A1 | 2/2000 |
| WO | WO 2005/009019 A2 | 1/2005 |

OTHER PUBLICATIONS

"Non-Final Office Action", U.S. Appl. No. 12/070,720, (Mar. 25, 2011), 6 pages.

"Notice of Allowance", U.S. Appl. No. 12/070,719, (Aug. 23, 2011), 7 pages.

"Notice of Allowance", U.S. Appl. No. 12/070,720, (Sep. 26, 2011), 8 pages.

Great Britain Search Report, GB08/01108.2, date of mailing May 15, 2009.

International Search Report from International Application No. PCT/EP2009/050596, 4 pp., Date Mailed: May 11, 2009.

Written Opinion of the International Searching Authority from International Application No. PCT/EP2009/050596, 7 pp., Date Mailed: May 11, 2009.

International Preliminary Report on Patentability from International Application No. PCT/EP2009/050596, 9 pp., Date Mailed: Aug. 5, 2010.

"Examination Report", GB Application No. 0801108.2, (Aug. 31, 2012), 3 pages.

\* cited by examiner

COMMUNICATION SYSTEM

RELATED APPLICATIONS

This application is a continuation of U.S. application Ser. No. 12/070,720, filed Feb. 20, 2008, now U.S. Pat. No. 8,098,813, which claims priority under 35 U.S.C. §119 or 365 to Great Britain, Application No. 0801108.2, filed Jan. 21, 2008. The entire teachings of the above applications are incorporated herein by reference.

TECHNICAL FIELD

The present invention relates to communication systems. More particularly the present invention relates to a method and apparatus for reducing echo that is present in a signal to be transmitted in a communication system.

BACKGROUND

In a communication system a communication network is provided, which can link together two communication terminals so that the terminals can send information to each other in a call or other communication event. Information may include audio, text, image or video data.

Modern communication systems are based on the transmission of digital signals. Analogue information such as speech is input into an analogue to digital converter at the transmitter of one terminal, hereinafter referred to as the near end terminal, and converted into a digital signal. The digital signal is then encoded and transmitted in data packets over a channel to the receiver of a destination terminal, hereinafter referred to as the far end terminal.

To transmit audio signals, such as speech, analogue audio data is input from a microphone at the near end terminal. The analogue audio data is then converted into digital data before it is transmitted to the far end terminal via the communication network.

A reply signal which is transmitted from the far end terminal, herein after referred to as the far end signal, is received at the near end terminal and output from a loudspeaker of the near end terminal.

A phenomenon commonly referred to as acoustic echo occurs when the far end signal output from the loudspeaker 20, as shown in FIG. 1, traverses an echo path 22 and is recorded by the microphone 10 of the near end terminal as an acoustic echo component in the near end signal. The echo component in the near end signal may in some cases cause the far end speaker to hear their own voice transmitted back from the near end terminal.

The echo path describes the effects of the acoustic paths travelled by the far end signal from the loudspeaker to the microphone. The far end signal may travel directly from the loudspeaker to the microphone, or it may be reflected from various surfaces in the environment of the near end terminal. The echo path may also describe any other effects that the far end signal has on the near end recording. For example the far end signal may cause mechanical vibration in the near end terminal, or cause electrical induction in the components of the near end terminal.

The echo path traversed by the far end signal output from the loudspeaker may be regarded as a system having a frequency and a phase response which may vary over time. By considering the echo component as the output of the system and the far end signal as the input of the system the frequency response of the echo path is a measure of the gain between the magnitudes of the output and the input of the system as a function of frequency.

In order to remove the acoustic echo from the signal recorded at the near end microphone it is necessary to estimate how the echo path changes the desired far-end loudspeaker output signal to an undesired echo component in the input signal. The effects of the echo path are estimated by calculating a mathematical representation of the relation between the signal output from the loudspeaker and the undesired echo input signal. The mathematical representation of the combined effects of the frequency and phase response which describes the echo path is hereinafter referred to as the echo path transfer function. When the echo path transfer function is accurately determined, the frequency response of the echo path transfer function will be equivalent to the frequency response of the actual echo path.

The echo path transfer function H(s) is the linear mapping of the Laplace transform X(s) of the far end signal to the Laplace transform Y(s) of the echo signal:

$$Y(s) = H(s)X(s) \quad \text{Equation (1)}$$

or $$H(s) = \frac{Y(s)}{X(s)} = \frac{\mathcal{L}\{y(t)\}}{\mathcal{L}\{x(t)\}} \quad \text{Equation (2)}$$

The echo path transfer function H(s) is calculated by comparing the far end loudspeaker signal with the near end signal recorded by the microphone. When the near-end speaker is silent and the far-end speaker is active, only the echo provided by the far end signal is recorded by the near end microphone. In this case, the echo path transfer function can be adaptively calculated to model the way that the far-end signal changes when traversing the echo path.

In known acoustic echo cancellation (AEC) techniques the adaptively calculated echo transfer function is used to provide filter coefficients that filter the far end signal to generate an estimate of the echo component in the near end signal in accordance with the echo path transfer function. The estimated echo may then be subtracted from the near end signal. Other AEC techniques employ attenuation based filtering methods that attenuate the near end signal according to the calculated echo path transfer function to remove the echo component from the near end signal.

FIG. 2 is a diagram of a known echo canceller according to the prior art. The echo canceller comprises far end and near end Short Time Fourier Transform (STFT) blocks 8 and 9 arranged to transform the far end and near end signals into far end and near end frequency domain signals respectively. Far end and near end energy blocks 10 and 11 are arranged to convert the far end and near end frequency domain signals into far end and near end power spectrums respectively.

A ratio block 1 is arranged to calculate the echo path transfer function by comparing the far end power spectrum and the near end power spectrum when the near end signal only contains the echo component. As shown the calculated echo path transfer function gains are multiplied with the far end power spectrum using a mixer 2, to generate a modified far end power spectrum that represents a power spectrum of the echo component in the near end signal.

By comparing the power spectrum of the echo component and the power spectrum of the near end component, attenuation gains are computed in block 3. The attenuation gains are then applied to the near end signal in block 4 to attenuate the echo component from the near end power spectrum.

In order to calculate the echo path transfer function when the near end signal only contains the echo component, a voice activity detector 5 is arranged to compare the voice activity on the far end and near end signals and to control the update rate of a far end smoothing filter 6 and a near end smoothing filter 7 accordingly. When speech is detected in the far end signal and only echo is detected in the near end signal the update rate of the smoothing filters 6 and 7 is controlled to be high. In all other cases the update rate is controlled to be low. As a result the outputs of the smoothing filters 6 and 7 are determined by the input signals that exist when the near end signal contains only echo.

The voice activity detector 5 is arranged to compare voice activity on the far end and near end signals by comparing calculated Signal to Noise Ratios (SNR) of the modified far end power spectrum and of the near end power spectrum. When the SNR value of the modified far end signal is high and the SNR value of the near end signal is not higher than the SNR value of the modified far end signal it may be determined by the voice activity detector that only echo is present on the near end signal.

The inventors of the present invention have identified that current acoustic echo cancellation methods, such as that described with reference to FIG. 2, do not reliably differentiate between the case where only echo is present on the near end signal and the case where the near end signal comprises both echo and a signal from the near end speaker.

For an AEC to effectively remove echo signals without causing distortions to the near end voice signal transmitted from the terminal, it is important that the smoothing filters are only updated when the near end signal contains only echo. A common problem with AECs is the updating of filters when both the near end speaker 23 and the far end speaker are active, hereinafter referred to as double talk. Updating the smoothing filters during double talk leads to the deterioration of the filter outputs, resulting in poor echo cancellation. Significant efforts have been made in the field to develop reliable double-talk detectors to solve this problem, with limited success. The difficulty is that in both the case where only echo is present on the near end signal and the case where double talk occurs, the far end and near end signals both contain active speech.

It is an aim of the present invention to provide an echo canceller with an improved method for detecting when the near end signal contains only echo and thereby provides more effective echo cancellation than currently known echo cancellation methods.

SUMMARY

According to a first aspect of the present invention there is provided a method for removing an echo component in a first signal received at an audio input device, said method comprising the steps of: outputting a second signal from an audio output device, receiving at the audio input device the first signal wherein the echo component in the first signal is the result of the second signal traversing an echo path; detecting if the first signal only comprises the echo component; determining an estimate indicative of the echo path by comparing the first signal and the second signal when it is detected that the first signal only comprises echo; applying the estimate indicative of the echo path to the first signal to determine an equalised first signal; comparing the equalised first signal with the second signal to determine an estimate indicative of the echo component; and removing the echo component from the first, signal in dependence on the estimate indicative of the echo component; wherein the step of detecting if the first signal only comprises the echo component comprises comparing a characteristic of the equalised first signal to a characteristic of the second signal.

According to a second aspect of the present invention there is provided a system arranged to remove an echo component in a first signal received at an audio input, wherein the echo component in the first signal is the result of a second signal output from an audio output traversing an echo path said system comprising: a detector arranged to detect if the first signal only comprises the echo component; a first ratio block arranged to determine an estimate indicative of the echo path by comparing the first signal and the second signal when it is detected that the first signal only comprises echo; a first mixer arranged to apply the estimate indicative of the echo path to the first signal to determine an equalised first signal; a second ratio block arranged to compare the equalised first signal with the second signal to determine an estimate indicative of the echo component; and an attenuator arranged to attenuate the echo component from the first signal in dependence on the estimate indicative of the echo component; wherein the detector is arranged to detect if the first signal only comprises the echo component by comparing a characteristic of the equalised first signal to a characteristic of the second signal.

BRIEF DESCRIPTION OF THE DRAWINGS

For a better understanding of the present invention and to show how the same may be carried into effect, embodiments of the present invention will now be described with reference to the following drawings.

DETAILED DESCRIPTION

Figure 2:
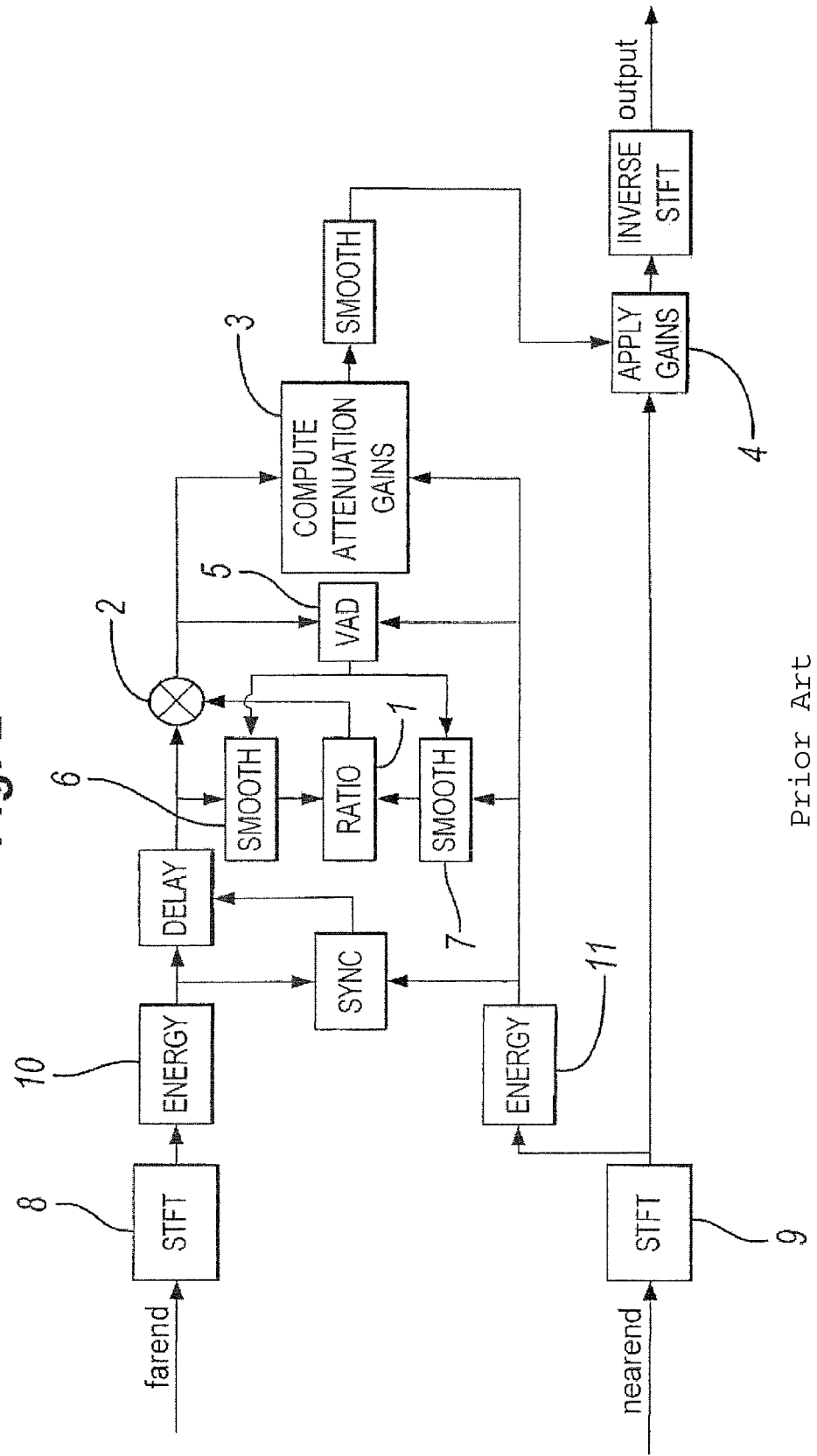
FIG. 2 is a diagram of a near end terminal according to the prior art.

The inventors of the present invention have identified that one reason that current echo cancellation methods, such as the method described in relation to FIG. 2, do not reliably detect double talk is that the calculated SNR value of the modified far end signal is less sensitive to changes in the far end signal and in the actual echo path transfer function than the calculated SNR value of the near end signal.

The calculated SNR value of the near end signal is sensitive to changes in the actual echo path transfer function. The actual echo path transfer function can contain strong acoustic resonances that are much narrower than the width of a STFT frequency band of the near end frequency domain signals. Such resonances will dominate the echo path estimate for the STFT frequency band that contains them, making the estimated echo path gain for that band very large. As a result, that single frequency band will strongly determine the SNR value for a voicing band of the near end signal containing the resonance. Since the SNR value of the modified far end signal is calculated before the far end signal traverses the actual echo path the SNR of the far end signal is less sensitive to resonances in the in the actual echo path transfer function.

The calculated SNR value of the near end signal is also dependent on the harmonic frequencies of the far end speech signal, as present in the echo component in the near end signal. When the far end speech signal is a voiced sound, i.e.

a harmonic sound, the echo path resonance frequency may or may not coincide with the frequency of one of the speech harmonics. When the harmonic sound coincides with a speech harmonic, the far end energy in the corresponding frequency band will be larger than when the resonance frequency falls in between the frequencies of the speech harmonics. In the former event, the near end SNR value for the voicing band will be significantly higher than in the latter event. In other words, the near end SNR value is sensitive to small changes in the harmonic frequencies, which continuously and naturally occur during regular speech.

Conversely the calculated SNR value of the modified far end power spectrum is insensitive to small changes in the harmonic frequencies of the far end signal. This is since the modified far end power spectrum is obtained by multiplying the far end power spectrum with the echo path estimate, both the far end power spectrum and the echo path estimate having low frequency resolution. The frequency resolution of the far end power spectrum and the echo path estimates are limited by the length in time of the window applied in the STFTs. In practice this means a resolution of about 100 Hertz. Resonances in the echo path can be much narrower than that, sometimes being only a few Hertz wide.

The inventors have therefore determined that as a result of the different sensitivities of the modified far end power spectrum SNR value and the near end power spectrum SNR value to small changes in the far end signal, comparing the two SNR value will not result in a reliable detection of the case where the near end signal comprises both an echo component and a signal from the near end speaker.

The inventors of the present invention have found that by equalising the near end signal using an inverse echo path transfer function and using the far end signal and the equalised near end signal to detect double talk, improved echo cancellation performance is achieved, as described hereinafter.

Figure 1:
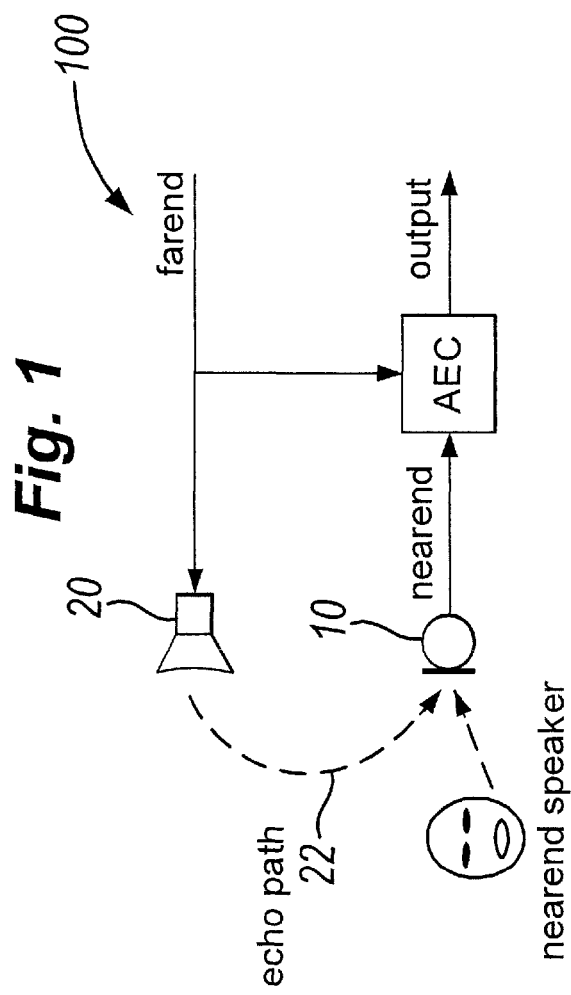
FIG. 1 is a diagram showing a near end terminal.
Figure 3:
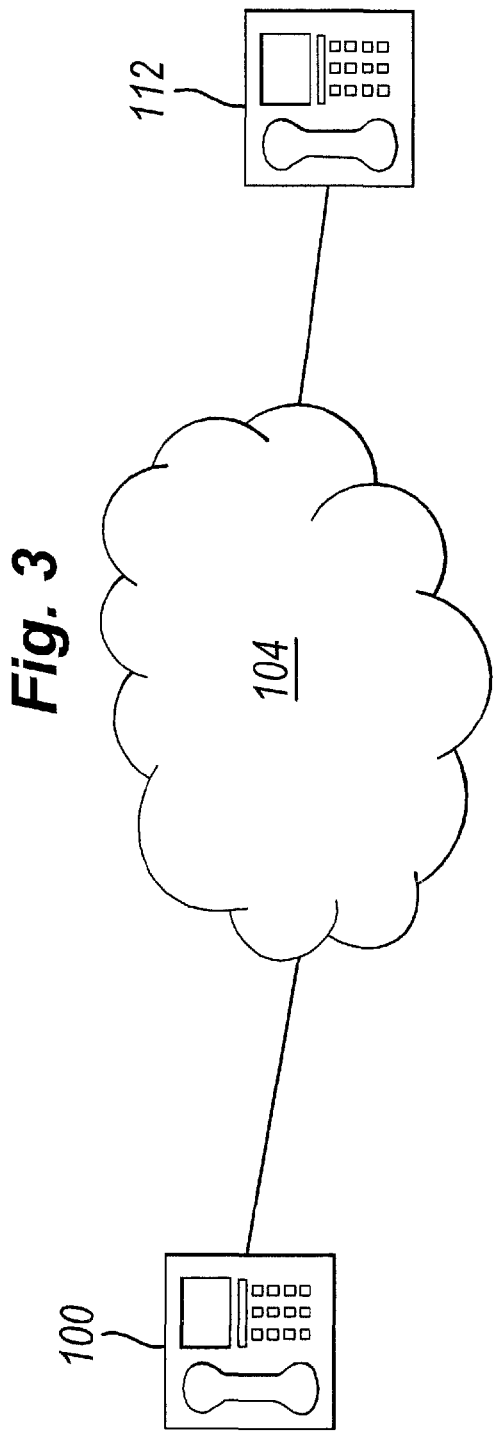
FIG. 3 is a diagram of a near end terminal and a far end terminal connected to a communication network.

Reference will now be made to FIG. 3, in which is shown a near end terminal 100 and a far end terminal 112 connected to a communication network 104. The near end terminal 100 and the far end terminal 112 are arranged to transmit information to each other via the communication network 104. In one embodiment of the invention the communications network is a VoIP (Voice Over Internet Protocol) network provided by the internet. It should be appreciated that even though the exemplifying communications system shown and described in more detail herein uses the terminology of a VoIP network, embodiments of the present invention can be used in any other suitable communication system that facilitates the transfer of data. Embodiments of the invention are particularly suited to asynchronous communication networks such as frame based systems as ATM, Bluetooth™ and Enhanced Data rates for GSM Evolution (EDGE) networks. IEEE 802.16 systems and any time slotted communication system.

The terminals 100 and 112 may be connected to the network 104 via a cable (wired) connection or a wireless connection. The terminals 100 and 112 may be, for example, a personal computer, a gaming device, a personal digital assistant, a suitably enabled mobile phone, a television or any other device able to connect to the network 104.

Figure 4:
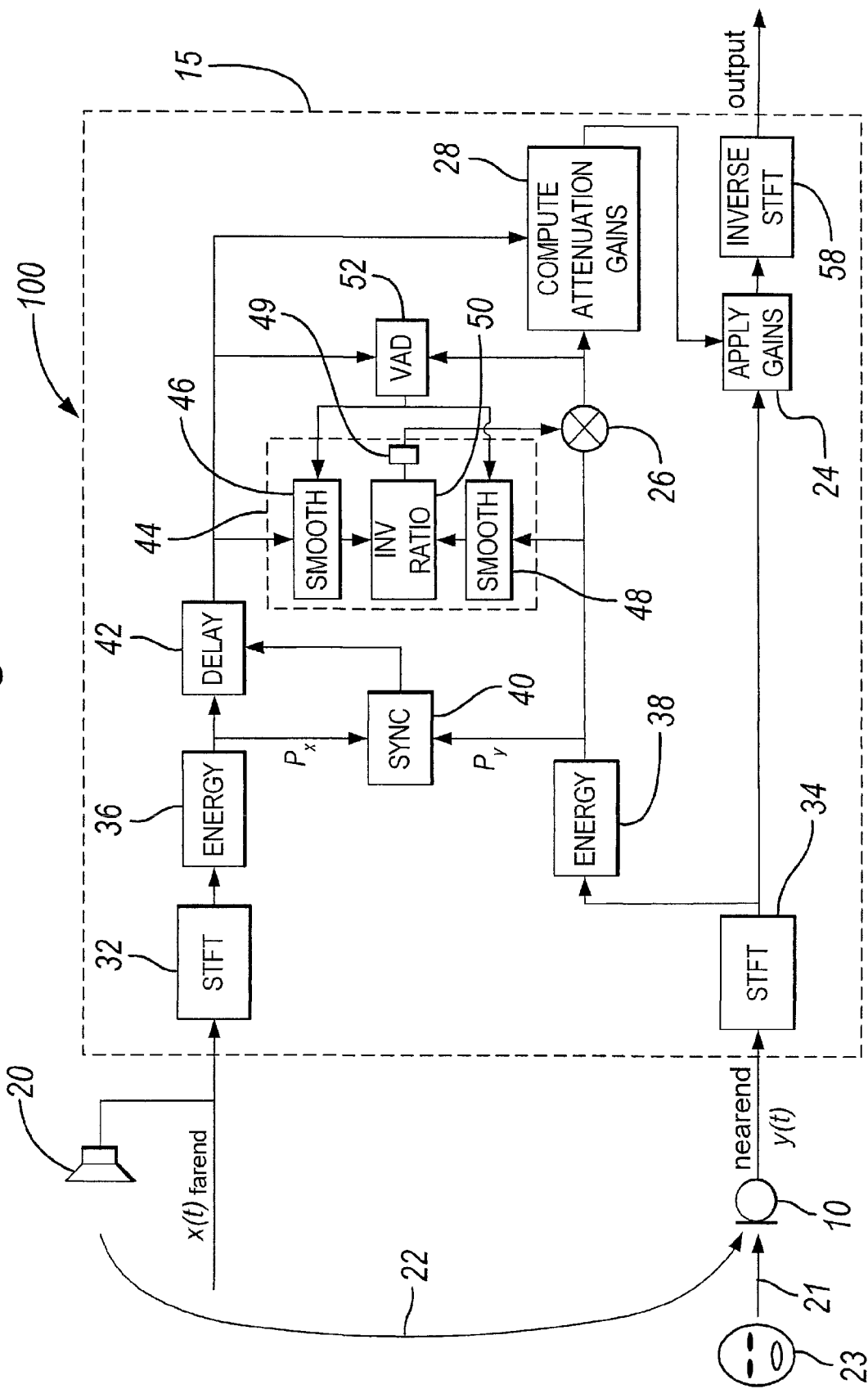
FIG. 4 is a diagram of a near end terminal according to an embodiment of the present invention.

FIG. 4 shows the near end terminal in more detail according to an embodiment of the present invention. The terminal 100 is arranged to receive a far end signal x(t) comprising a speech signal and background noise transmitted from the far end terminal 112 via the network 104. Alternatively the signal x(t) may comprise any signal generated at the near end terminal that is output via the loudspeaker 20, for example speech synthesis of text, playback of a recording, voice mail, or ring tones.

A microphone 10 receives a near end signal y(t) which comprises a near end component 21 such as a speech signal input from a user 23 of the terminal 100 and background noise, and an echo component 22 resulting from the far end signal x(t) after it has traversed the echo path The near end terminal 100 comprises an audio echo canceller (AEC) block 15 arranged to receive the near end signal from a microphone 10 and the far end signal x(t).

The AEC block 15 is arranged to apply a gain to the near end signal y(t) to remove an estimate of the echo component. The estimate of the echo component removed from the near end signal is provided by an echo path model determined by the AEC block. The operation of the AEC block will be described hereinafter.

The terminal 100 outputs a signal z(t) to be transmitted to the far end terminal via the network 104. The output signal z(t) is the resulting signal after the echo component 22 has been removed or reduced from the near end signal y(t).

As shown in FIG. 4, the AEC block comprises far end and near end Short Time Fourier Transform (STFT) blocks 32 and 34, far end and near end energy blocks 36 and 38, a mixer 26, a gains calculator block 28, an apply gains block 24, a synchronization block 40, a delay block 42, an inverse echo path transfer function block 44, a Voice Activity Detector (VAD) block 52 and an inverse STFT block 58. Each of these components may be implemented as hardware in the terminal or as software running on a processor in the terminal. This is an implementation preference.

In operation, the near end signal y(t) is input into the near end STFT block 34 where the near end signal is transformed to the frequency domain using a Short Time Fourier Transform. This may be implemented with a Fast Fourier Transform (FFT). According to a preferred embodiment of the invention the STFT is applied every 5 milliseconds (ms) and results in 64 frequency bands represented by STFT coefficients. The near end STFT coefficients are then input into the near end energy block 38 where the magnitude of the STFT coefficients are squared to produce a near end power spectrum signal Py.

In the same way, the far end signal x(t) is input into the far end STFT block 32 where the far end signal is transformed into the frequency domain. The far end STFT coefficients output from the far end STFT block 32 are then input into the far end energy block 36 which squares the magnitudes of the far end STFT coefficients to produce a far end power spectrum signal Px.

The near end power spectrum signal Py and the far end power spectrum signal Px are input into the synchronization block 40.

The synchronization block 40 is arranged to analyze the far end and near end power spectrum signals to determine the delay between the far end signal and the far end signal transformed by the echo path present in the near end signal. This may be achieved by correlating the maximum energy points in the near end and far end power spectrum signals when the far end speaker is active and the near end speaker is inactive.

The synchronization block 40 is arranged to output the determined delay to the delay block 42. The delay block 42 receives the far end power spectrum from the energy block 36. The delay block 42 is arranged to delay the far end power spectrum signal by the amount determined by the synchronization block 40. The delay applied by the delay block 42 compensates for the delay caused by the echo path traversed by the far end signal before it is recorded by the microphone 10 as echo.

The delayed far end power spectrum signal Px output from the delay block 42 is input to the inverse echo path transfer function block 44 together with the near end power spectrum signal Py output from the energy block 38.

The inverse echo path transfer function block comprises three Infinite Impulse Response (IIR) smoothing filters 46, 48 and 49, and an inverse ratio block 50. The far end power spectrum is input into the smoothing filter 46 and the near end power spectrum is input into the smoothing filter 48. The inverse echo path transfer function block is also arranged to receive an input from the VAD block 52 which is input into both the smoothing filters 46 and 48.

The smoothing filters 46 and 48 are arranged to smooth the far end power spectrum and the near end power spectrum respectively. The VAD 52 is arranged to control the update rate of the smoothing filters 46 and 48. The operation of the VAD will be described hereinafter.

The update rate of each smoothing filter defines how quickly the output of the filter follows the input of the filter. The input from the VAD 52 controls the update rate of the smoothing filters 46 and 48 such that if speech is only detected on the far end signal, the update rate of the filters is controlled to be high, and as such the smoothing applied by the smoothing filters 46 and 48 is low. In all other cases the VAD controls the update rate of the filters 46 and 48 to be low, and as such the smoothing applied by the filters will be high. As a result, the outputs from the smoothing filters 46 and 48 are substantially determined by the state of the far end power spectrum and the near end power spectrum that are input into the filters 46 and 48 when only echo exists in the near end signal.

The smoothing applied by the smoothing filters 46 and 48 can be expressed mathematically as:

$$Sx(k,t)=(1-a)Sx(k,t-1)+a\,Px(k,t) \quad \text{Equation (3)}$$

$$Sy(k,t)=(1-a)Sy(k,t-1)+a\,Py(k,t) \quad \text{Equation (4)}$$

where Sx and Sy are the smoothed far end and near end power spectra respectively, Px and Py are the unsmoothed far end and near end power spectra respectively, k is the frequency band at time t and a is the update rate.

The outputs from the smoothing filters 46 and 48 are input into the inverse ratio block 50. The inverse ratio block 50 is arranged to compare a frame of the smoothed near end power Sy with a frame of the smoothed far end power spectrum Sx to determine the ratio of the smoothed near end-to-far end power for each frequency band.

The inverse ratio block 50 may also be arranged to add a bias to the ratios to provide robustness against underestimation of the smoothed far end power spectrum. This underestimation may for instance happen early on in a call when the far end speaker has not spoken much yet, and can lead to over-attenuation of the near end signal in a subsequent stage, distorting the near end speaker's voice.

The biased ratios output from the inverse ratio block of the inverse echo path transfer function block 44 describe the inverse echo path gain for each frequency band. That is, the ratios describe the inverse of the proportion of the far end power spectrum that is present in the near end power spectrum as echo. The inverse echo path gain is described in Equation (5) as:

$$H\text{inv}(k)=Sx(k)/Sy(k)+\text{bias}(k) \quad \text{Equation (5)}$$

where Hinv(k) is the inverse echo path gain for frequency band k (the time index has been omitted). The inverse echo path gain output from the inverse ratio block 50 may be smoothed over time to reduce fluctuations by the smoothing filter 49.

The inverse echo path gains output from the inverse echo path transfer function block 44 are input into the mixer 26. The mixer 26 is also arranged to receive the unsmoothed near end power spectrum output from the near end energy block 38. The inverse echo path gains are multiplied with the unsmoothed near end power spectrum in mixer 26. Multiplying the inverse echo path gains with the unsmoothed near end power spectrum produces an estimate of a hypothetical far end power spectrum that would have created the observed near end power spectrum after passing through the echo path if no near end speech from user 23 is present. This results in an equalized near end power spectrum, which can be directly compared to the far end power spectrum to determine the proportion of the far end signal that is present as echo in the near end signal. The equalized near end power spectrum is defined in Equation (6) as:

$$Peqy(k)=H\text{inv}(k)Py(k) \quad \text{Equation (6)}$$

where Peqy(k) is the equalized near end power spectrum output from the mixer 26.

The equalized near end power spectrum output from the mixer 26 is input into the gains calculator block 28. The gains calculator also receives the far end power spectrum signal as an input from the delay block 42.

The gains calculator block 28 is arranged to calculate the gain in each band according Equation (7):

$$G(k)=1-\min(\max(Px(k)/Peqy(k),0),1) \quad \text{Equation (7)}$$

where G(k) is the gain, Px(k) is the far end power spectrum and Peqy(k) is the equalized near end power spectrum for a frequency k. As shown by Equation 7 above, the gains calculated in the gains calculator 28 cannot exceed 1 or fall below zero. As such when the gain G(k) is applied to the near end signal at the frequency k the near end signal at the frequency k will be attenuated or stay the same.

The gains output from the gains calculator block 28 may be smoothed over both time and frequency to prevent artefacts from occurring due to large fluctuations in the gains.

The smoothed gains are output from the smoothing filter and input into the apply gains block 24. The apply gains block 24 also receives the near end STFT output from the near end STFT block 34. The apply gains block 24 is arranged to apply the smoothed attenuation gains to the near end STFT spectrum by multiplying each gain with the corresponding frequency band of the near end STFT spectrum.

The attenuated near end Fourier spectrum is output from the apply gains block 24 and input into the inverse STFT block 58. The inverse STFT block 58 transforms the attenuated near end STFT spectrum into the time domain to produce the output signal to be transmitted to the far end terminal 112.

The operation of the VAD 52 to determine the update speed of the smoothing filters 46 and 48 according to an embodiment of the invention will now be described.

The VAD 52 receives the far end power spectrum Px and the equalized near end power spectrum Peqy as inputs. The VAD is arranged to divide each power spectrum Px and Peqy into three voicing bands, 0-2 kHz, 2-4 kHz and 4-8 kHz for speech sampled at 16 kHz.

The VAD determines the average energy of the frequency bands within each voicing band. The VAD is also arranged to estimate the average noise level within each voicing band. From the average energy and the average noise level the VAD may determine the Signal-to-Noise Ratio (SNR) value in each voicing band. The SNR values for the three voicing bands are averaged to produce the average SNR for the far end power spectrum and the equalized near end power spectrum respectively.

By comparing the far end and near end average SNR values, the VAD is arranged to determine the appropriate update rate for the smoothing filters 46 and 48. The update rate is set high if the following two conditions are both met:

1) the far end average SNR is high, and
2) the near end average SNR is not higher than the far end average SNR.

If condition (1) is met this ensures that the smoothing filters 46 and 48 are updated only when speech is likely to be present in the far end signal. If condition (2) is met this ensures that the smoothing filters 46 and 48 are updated when the near end signal only contains echo. That is condition (2) is used to avoid updating the smoothing filters 46 and 48 when both the user of the near end terminal 100 and the far end terminal 112 are speaking simultaneously.

According to embodiments of the present invention, the VAD is arranged to compare average SNR values of the far end power spectrum and of the equalized near end power spectrum. Assuming the inverse echo path gain, Hinv(k), is a good approximation of the actual inverse echo path, the equalized near end power spectrum will be very similar to the (synchronized) far end power spectrum when the near end signal contains only echo. Consequently, the far end and near end average SNR values derived from these two power spectra will be very similar when the near end signal contains only echo.

In contrast, during double talk the near end power spectrum will generally contain more energy due to the presence of a speech signal from the near end speaker 23, which leads to a higher near end average SNR than far end average SNR. These properties enable the VAD to reliably distinguish the case where only echo is present on the near end signal from the case where double talk occurs.

The prior art method described in relation to FIG. 2 compares the power spectrum of the echo component present in the near end signal that has traversed the actual echo path to the estimated echo component derived from applying the estimated echo path transfer function to the far end signal. Conversely the method according to embodiments of the invention compares the power spectrum of the far end signal with the power spectrum of an estimation of a hypothetical far end signal that would have created the observed near end signal after passing through the echo path if no near end speech from user 23 is present.

Equalizing the near end power spectrum by multiplication with the estimated inverse echo path causes the STFT frequency bands to have a weight in the SNR calculation that, for echo signals, is essentially independent of the echo path. Such "undoing" of the echo path coloration provides inherent robustness against detrimental effects from the echo path on the double talk detection.

Embodiments of the present invention have the advantage of being insensitive to narrow resonances in the actual echo path because the estimated inverse echo path will have low values for STFT frequency bands containing such resonances. Consequently, these bands will have less weight in the calculation of the SNR value based on the power averaged over multiple STFT frequency bands. Furthermore, embodiments of the present invention are insensitive to narrow notches in the actual echo path, because the time smoothing done on the near end power spectrum in filter 48 will remove most of the effects of such notches.

While this invention has been particularly shown and described with reference to preferred embodiments, it will be understood to those skilled in the art that various changes in form and detail may be made without departing from the scope of the invention as defined by the claims.

What is claimed is:

1. A method comprising:
   receiving at an audio input device a first signal including an echo component that is a result of a second signal traversing an echo path;
   detecting that the first signal comprises the echo component;
   determining an estimate indicative of the echo path including determining a delay between the second signal being output by an output device and the first signal being received at the audio input device by comparing the first signal and the second signal in response to detecting that the first signal comprises echo;
   applying the estimate indicative of the echo path to the first signal to determine an equalized first signal;
   applying the delay to the second signal;
   comparing the equalized first signal with the delayed second signal to determine an estimate indicative of the echo component; and
   removing the echo component from the first signal based on the estimate indicative of the echo component.

2. A method as recited in claim 1, wherein the second signal comprises signal output from a speaker and the first signal comprises the output from the speaker received at the audio input device.

3. A method as recited in claim 2, wherein the echo path includes an indication of one or more effects of an acoustic path traveled by the second signal from the speaker to the audio input device.

4. A method as recited in claim 1, wherein said determining comprises comparing a power spectrum of the first signal with a power spectrum of the second signal to determine the delay between the first signal and the second signal.

5. A method as recited in claim 1, wherein said detecting comprises comparing a characteristic of the equalized first signal to a characteristic of the second signal.

6. A method as recited in claim 1, wherein said applying comprises equalizing the first signal using an inverse echo path transfer function to determine the equalized first signal.

7. A method as recited in claim 1, wherein said comparing comprises comparing a power spectrum of the equalized first signal with a power spectrum of the second signal.

8. A method as recited in claim 1, wherein said comparing comprises comparing a signal to noise ratio of the equalized first signal with a signal to noise ratio of the second signal.

9. A system comprising:
   one or more processors; and
   software stored on the system and executable by the one or more processors to cause the system to perform operations comprising:
      receiving a first signal including an echo component that is a result of a second signal traversing an echo path;
      determining an estimate indicative of the echo path by comparing the first signal and the second signal to determine a delay between the second signal and the first signal;
      applying the estimate indicative of the echo path to the first signal to determine an equalized first signal;
      applying the delay to the second signal;
      comparing the equalized first signal with the delayed second signal to determine an estimate indicative of the echo component; and
      removing the echo component from the first signal based on the estimate indicative of the echo component.

10. A system as recited in claim 9, herein the second signal comprises signal output from a speaker of the system and the first signal comprises the output from the speaker received at an audio input device of the system.

11. A system as recited in claim 9, wherein said determining comprises comparing a power spectrum of the first signal with a power spectrum of the second signal to determine the delay between the first signal and the second signal.

12. A system as recited in claim 9, wherein said applying comprises equalizing the first signal using an inverse echo path transfer function to determine the equalized first signal.

13. A system as recited in claim 9, wherein said comparing comprises comparing a power spectrum of the equalized first signal with a power spectrum of the second signal.

14. A system as recited in claim 9, wherein said comparing comprises comparing a signal to noise ratio of the equalized first signal with a signal to noise ratio of the second signal.

15. A communication terminal comprising:
an audio echo canceller implemented at least in part in hardware and configured to perform operations including:
receiving a first signal including an echo component that is a result of a second signal traversing an echo path;
determining an estimate indicative of the echo path by comparing the first signal and the second signal to determine a delay between the second signal and the first signal;
applying the estimate indicative of the echo path to the first signal to determine an equalized first signal;
applying the delay to the second signal;
comparing the equalized first signal with the delayed second signal to determine an estimate indicative of the echo component;
removing the echo component from the first signal based on the estimate indicative of the echo component to generate; and
a speaker component configured to output the first signal with the echo component removed.

16. A communication terminal as recited in claim 15, wherein the second signal comprises signal output from the speaker component and the first signal comprises the output from the speaker component received at an audio input device of the communication terminal.

17. A communication terminal as recited in claim 15, wherein said determining comprises comparing a power spectrum of the first signal with a power spectrum of the second signal to determine the delay between the first signal and the second signal.

18. A communication terminal as recited in claim 15, wherein said applying comprises equalizing the first signal using an inverse echo path transfer function to determine the equalized first signal.

19. A communication terminal as recited in claim 15, wherein said comparing comprises comparing a power spectrum of the equalized first signal with a power spectrum of the second signal.

20. A communication terminal as recited in claim 15, wherein said comparing comprises comparing a signal to noise ratio of the equalized first signal with a signal to noise ratio of the second signal.

\* \* \* \* \*